United States Patent
Shamasundar et al.

(10) Patent No.: US 11,159,640 B2
(45) Date of Patent: Oct. 26, 2021

(54) DATA SYNCHRONIZATION OF ONBOARD DATALINK APPLICATION WITH OFFBOARD DATALINK APPLICATION

(71) Applicant: Honeywell International Inc., Morris Plains, NJ (US)

(72) Inventors: Raghu Shamasundar, Bangalore (IN); Thomas D. Judd, Woodinville, WA (US); Sundaresh Seethahally Krishnamurthy, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 239 days.

(21) Appl. No.: 16/374,504

(22) Filed: Apr. 3, 2019

(65) Prior Publication Data
US 2020/0322449 A1 Oct. 8, 2020

(51) Int. Cl.
*H04L 29/08* (2006.01)

(52) U.S. Cl.
CPC ............ *H04L 67/32* (2013.01); *H04L 67/12* (2013.01)

(58) Field of Classification Search
CPC ..... H04L 67/32; H04L 67/12; H04L 67/1095; G08G 5/0013; G08G 5/0021; G09G 2380/12; G09G 2370/16; G06F 3/147
See application file for complete search history.

(56) References Cited

U.S. PATENT DOCUMENTS

| | | | |
|---|---|---|---|
| 8,280,563 B2 | 10/2012 | McGuffin et al. | |
| 8,364,328 B2 | 1/2013 | Hedrick | |
| 9,980,298 B2 | 5/2018 | Batsakes et al. | |
| 2009/0058682 A1 | 3/2009 | True | |
| 2014/0380433 A1 | 12/2014 | Yerger et al. | |
| 2015/0171956 A1* | 6/2015 | Wang | H04W 72/0446 370/252 |
| 2016/0144714 A1* | 5/2016 | Kim | B60K 35/00 701/36 |
| 2017/0242564 A1 | 8/2017 | De Bossoreille | |
| 2017/0289309 A1 | 10/2017 | Judd et al. | |
| 2017/0353555 A1* | 12/2017 | Lauer | H04W 4/48 |
| 2018/0007137 A1 | 1/2018 | Watson et al. | |
| 2020/0152070 A1* | 5/2020 | Fraser | H04L 47/2408 |

FOREIGN PATENT DOCUMENTS

EP    3226227 A1    10/2017

OTHER PUBLICATIONS

European Patent Office, "Extended European Search Report from EP Application No. 20166045.3", from Foreign Counterpart to U.S. Appl. No. 16/374,504, dated Sep. 7, 2020, p. 1 through 7, Published: EP.

* cited by examiner

*Primary Examiner* — Oanh Duong
(74) *Attorney, Agent, or Firm* — Fogg & Powers LLC (57) ABSTRACT

A communication system is provided. The communication system comprises a communication management unit (CMU) comprising a processor, a memory and an input/output port; wherein the processor is configured to run a distribution application operable to: when data is received from a ground system at the input/output port, transmit the data to a designated first device and transmit selected data of the data received at the input/output port to at least one designated second device; and when data is received from the first device or the second device, transmit the data to the other of the first and second device as well as an intended recipient of the data.

20 Claims, 4 Drawing Sheets

DATA SYNCHRONIZATION OF ONBOARD DATALINK APPLICATION WITH OFFBOARD DATALINK APPLICATION

BACKGROUND

In conventional systems, the datalink application is a key entity in a cockpit system to handle and process communication between a flight crew and an air traffic controller (ATC) or an airline operation controller (AOC). In conventional systems, these messages may be received, processed and/or sent automatically by an avionics system. Datalink applications, such as airline operational controller (AOC) message, air traffic controller (ATC) messages and automatic dependent surveillance (ADS) messages, help the crew in operating the vehicle in a safer and more efficient manner.

Uplink messages from ground stations or other devices (such as electronic flight bags or the like) received by a communication system of a vehicle are generally loaded on to end systems. For example, a flight plan uplink that initializes or modifies the route of a flight are generally destined to a Flight Management System (FMS) end system.

Conventionally, a pilot navigates pages displayed in the cockpit on a traditional display system (ex., human machine interface (HMI) display). However, recently more offboard applications, such as a tablet system (such as a tablet, iPad, smartphone, or the like) or an electronics flight bag (EFB) are gaining wider acceptance in conventional aviation systems. Typically, applications running on these offboard devices are easier to navigate and require less heads-down time by the flight crew. If a datalink application were hosted on such an offboard device, a mechanism to direct the messages to and from the offboard device would be needed. Unfortunately, the most straight forward approach would be to update existing industry protocol standards to define a path for uplink messages to the applications on offboard devices. This would introduce significant delay and cost in moving these applications to offboard devices.

For the reasons stated above and for other reasons stated below, it will become apparent to those skilled in the art upon reading and understanding the specification, there is a need in the art for methods and systems for more effectively enabling the use of offboard devices for the datalink and other applications that traditionally are run on onboard devices without requiring an update to existing protocols and also avoiding any new interface definition.

SUMMARY

A communication system is provided. The system comprises a communication management unit (CMU) comprising a processor, a memory and an input/output port. When data is received from a ground system at the input/output port, the processor is configured to run a distribution application operable to transmit the data to a designated first device and transmit selected data of the data received at the input/output port to at least one designated second device. When data is received from the first device or the second device, the processor is configured to run a distribution application operable to transmit the data to the other of the first and second device as well as an intended recipient of the data.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As offboard devices gain wider acceptance, datalink applications, such as airline operational controller (AOC) messages, air traffic controller (ATC) messages and automatic dependent surveillance (ADS) messages will get hosted on offboard sub-applications on mobile devices such as an electronic flight bag (EFB), a tablet, or a smartphone. These datalink applications can be hosted partially or completely on the offboard devices. For example, ATC and/or AOC logs that maintain uplinks and downlink, conventionally hosted on a communication management unit (CMU) datalink application or a Flight Management System (FMS), can be hosted as an offboard application to achieve operational objectives. In another example, controller—pilot data link communications (CPDLC) messages, which may be hosted in the CMU or in the FMS, along with its status are also expected to be provided on offboard devices.

Embodiments of the present description provide systems and methods for synchronization of data between two devices. Specifically, embodiments described herein provide methods and systems to achieve synchronization between datalink applications hosted on different end systems using a communication management unit. The communication management unit maintains synchronization between the onboard datalink application and the offboard datalink application by decoding and modifying received datalink messages. These messages can be redistributed so that both the onboard datalink application and the offboard datalink application will have similar data hosted simultaneously. Accordingly, the embodiments described herein provide seamless connectivity between two devices such as a cockpit system and application hosted on other devices.

Figure 1:
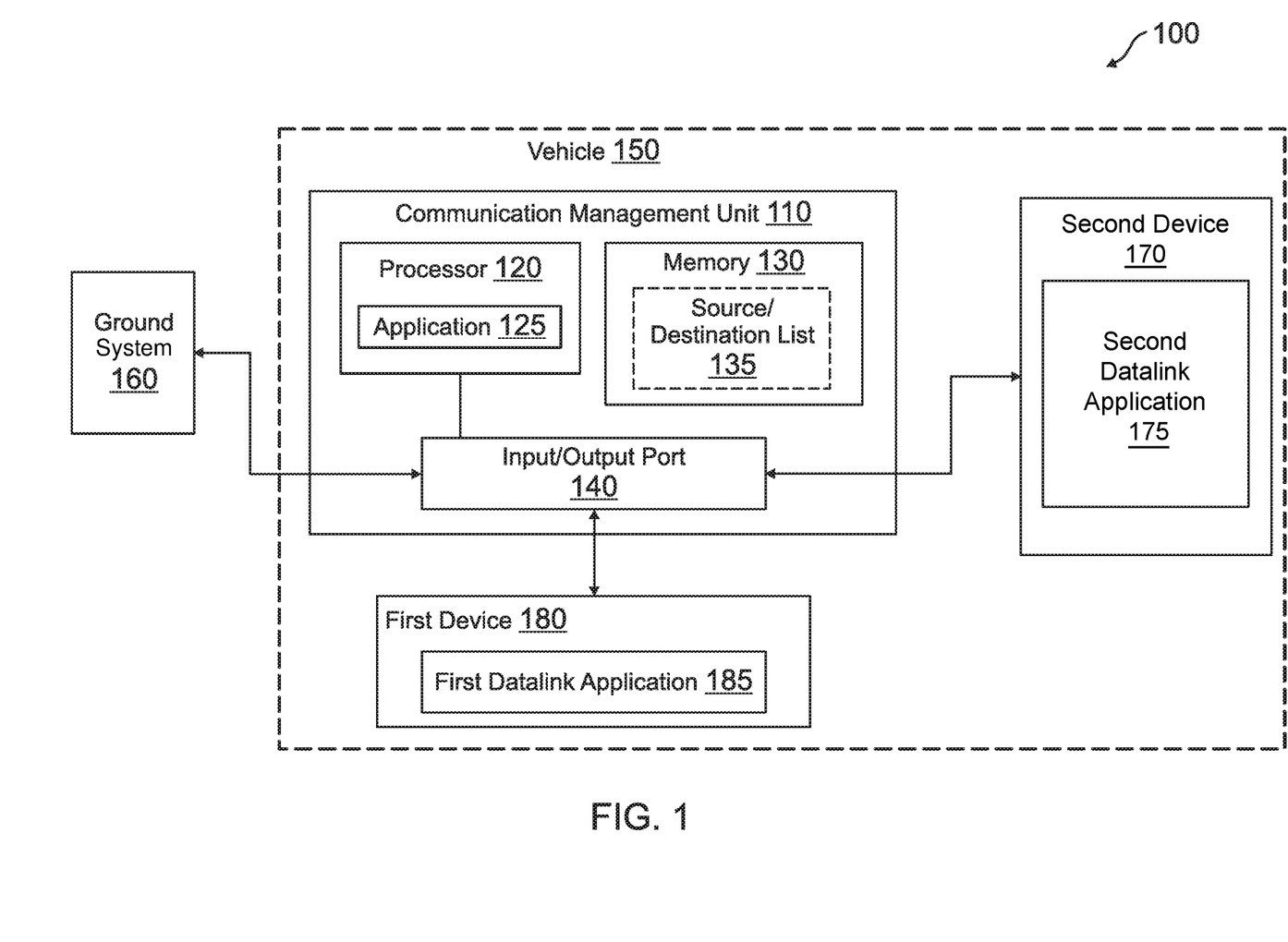
FIG. 1 illustrates one exemplary embodiment of a system for synchronization of data between two devices.

FIG. 1 illustrates an exemplary system 100 for synchronization between two devices. System 100 includes a ground system 160, a vehicle 150, a first device 180 and at least one second device 170. In exemplary embodiments, vehicle 150 is an aircraft. In exemplary embodiments, the first device 180 is an onboard device of vehicle 150. As described in the embodiments herein, an onboard device is a device that is directly attached to a vehicle 150 (ex. flight management system (FMS) and a control display unit (CDU)). In exemplary embodiments, the at least one second device 170 is an offboard device. As discussed herein, offboard devices are devices that are accessible by the user even when the user is not onboard vehicle 150. For example, Electronic Flight Bag (EFB), a smartphone, electronic tablets (ex. iPad) are examples of offboard devices. In a further exemplary embodiment, the first device 180 is an offboard device. In exemplary embodiments, second device 170 is a device that can be installed on vehicle 150. In exemplary embodiments, second device 170 may be a device that can be installed on a different vehicle. For example, second device 170 may be an electronic flight bag that is installable on an aircraft.

Vehicle 150 includes a communication management unit (CMU) 110 that is configured to send and receive uplink and downlink messages, respectively. In exemplary embodiments, CMU 110 is an onboard line replacement unit (LRU). Further, CMU 110 works as a router to route uplink messages received by vehicle 150 to an appropriate end system such as a flight management system (FMS). In exemplary embodiments, the uplink messages are routed to a datalink application that resides in the CMU/CMF itself. CMU 110 further routes the downlink messages generated by end systems to appropriate destinations such as ground systems. The source from which the datalink message is generated and the destination to which the datalink message is to be transmitted are embedded in the datalink message itself.

As shown in FIG. 1, CMU 110 further comprises an input/output port 140, a processor 120 and memory 130. CMU 110 receives and transmits datalink messages to other devices and ground systems via input/output port 140. In exemplary embodiments, these datalink messages may be pertinent to clearance requests, wind data, or other flight information.

As shown in FIG. 1, in an exemplary embodiment, CMU 110 receives a message, such as a datalink message, from ground system 160 at input/output port 140. This message is then processed by an application 125 running on processor 120. The application 125 analyzes the message using the data in the source and destination list 135 stored in memory 130. That is, in exemplary embodiments, application 125 determines the offboard datalink application, if any, that the message needs to be forwarded to by accessing a source and destination list 135 stored in memory 130.

That is, the datalink message includes a label or a label plus sub-label corresponding to a specific system of vehicle 150. For example, when an uplink message is received from ground system 160, a label or a label plus sub-label included in the uplink message indicates the source (such as a ground application running on, for example, ground system 160) and the destination (i.e., the system to which the message is to be sent to). The source and destination associated with the label or label plus sublabel are then compared to the source and destination list 135 to determine the offboard datalink application that the message needs to be forwarded to. Similarly, downlink messages include a label that indicates the source as the system generating the downlink message (for example, an FMS or a CMU application) and the destination (such as a ground application running on, for example, ground system 160).

If the message is intended for an application running on more than one device, the application 125 forwards the message to the recipient (device) identified in the message, for example, first device 180 running application 185 (such as a first datalink application). In one embodiment, first device 180 is an onboard device of the vehicle such as a flight management system. Application 125 also modifies the message and transmits this message to any other device determined by application 125 to be running an application that uses the same data as the application running on the first device. For example, if second device 170 and first device 180 are both running a datalink application, then application 125 forwards the appropriate data received in the message from the ground system 160 to the second device 170 for use by application 175. In one embodiment, second device 170 is an offboard device such as an EFB, a tablet or a smartphone.

In exemplary embodiments, application 125 enables subsequent synchronization using exemplary methods such as operational program configuration (OPC), aircraft modifiable information (AMI) or aircraft program module (APM) to indicate the datalink application that is hosted and the offboard device on which the datalink application is hosted. The OPC, APM and AMI methods allow changing functionality of a system by using loadable software or configurable modules instead of installing additional hardware LRU. For example, an OPC software includes a specialized database that determines LRU configuration by enabling or disabling optional features in the operational program software (OPS). Similarly, AMI data files are often used by LRUs to provide necessary information that may be used by the OPS when data needs to be formatted. Accordingly, OPC or AMI or another similar method can be used to configure the operational system, and consequently enable synchronization between two devices. In exemplary embodiments, AMI database comprises airline operational controller (AOC) database.

Conventionally, messages received at the CMU 110 are destined for an application running on a single device. Embodiments of the present invention enable use of the same or similar application on multiple devices by synchronizing the data used by the applications on the multiple devices. CMU 110 learns of a second or subsequent device running the same or similar application when the device is turned on and the application is started. In exemplary embodiments, when a user turns on a second device 170, e.g., an offboard device and logs into offboard application 175, a data item is generated indicating the type of offboard device and the type of application that is running on the device. This data item is stored in the source and destination list 135 in memory 130. The source and destination list 135 includes a list of items, each one indicating the source of a message and the offboard device that is able to host the datalink application corresponding to the received uplink message. For example, "ENABLE_ATC_LOG_MOBILE APP" indicates that a datalink ATC log application is hosted on a mobile device and needs at least a selected portion of the same data as that of data ATC log on the onboard end system. Thus, application 125 uses data in source and destination list 135 to synchronize data for related applications running on different devices.

Applicant 125 uses information in the header of messages received to synchronize the data on the various devices running the same or similar application as indicated in the source and destination list 135. In one embodiment, the header of the datalink message includes a destination code to indicate where the datalink message is destined to. Further, the header also includes origin codes and purpose codes for the given datalink message. Accordingly, application 125 running on processor 120 of CMU 110 can then decode these messages and modify them appropriate to the destined system. CMU 110 thus acts as router to route at least a selected portion of these messages to the destined devices.

For example, an uplink message "GVAXXX" may be received by CMU 110. In such an example, 'G' is the origin code indicating that the message has generated from a ground system 160. In exemplary embodiments, the ground system 160 is an ATC center. In exemplary embodiments, ground system 160 is an AOC center. In this example, 'V' is the purpose code and indicates that the message is an uplink message. Further, the destination code in this example is designated by 'A'. In this example, 'A' indicates that the first device 180 that the message is intended for is Left Flight Management System (FMS). Application 125 running on processor 120 also re-creates the message to share with the offboard device. For example, the recreated message may be generated as "GVZXXX." While the origin code and the purpose code remain the same, the destination code is changed to indicate the second device 170. 'Z' in this example indicates that the message is intended for left EFB. The recreated message is, thus, received and hosted by a corresponding offboard datalink application 175 on left EFB. 'XXX' represents that data in the message and is not modified when the message is recreated. Accordingly, the first datalink application 185 and offboard datalink application 175 can be synchronized by sharing the received uplink data between the two applications without changing CMU 110. In exemplary embodiments, the initially received uplink message is stored in memory 130.

Accordingly, the uplink messages are more efficiently directed to the datalink application 175 hosted on second device 170 within the existing interface protocols. Further, because the synchronization process is performed by the CMU 110, the pilot work load is reduced while the crew visibility and efficiency is increased. The datalink message received from the ground system 160 can be viewed on an offboard device such as an EFB or a tablet, enabling a graphical rendering of the message with an increased user experience. Thus, because the interface for the flight crew is easier to work on an offboard device, the pilot and/or the crew can view and respond to messages in a faster and efficient manner.

In exemplary embodiments, first application 185 and second application 175 may both originate messages to the ground system 160. To make sure that both applications 185 and 175 remain synchronized, application 125 replicates data from messages received from first and second applications 175 and 185 and shares it with the other of the two applications. For example, when a response message is generated by the first application 185 in response to or in rejection of a received uplink message from ground system 160, application 125 determines which other device, if any, is running a corresponding application to the application that generated the message being sent to the ground system 160. Application 125 then shares the data from the response message with the corresponding application running on the other device, e.g., the second application 175 on the second device 170. In exemplary embodiments, offboard application 175 is updated to display status that a response message has been generated in response to the uplink message, and further displays response message that has been generated. Similarly, when a response message is generated by the offboard application 175 in response to the received uplink message, first datalink application 185 hosted on second device 180 is also updated to display the response message and/or the status of the response message. In exemplary embodiments, the response message is transmitted to the ground system 160 through any of the first application 185 or offboard application 175.

In exemplary embodiments, the CMU 110 is configured to synchronize a plurality of second devices 170, e.g., offboard devices, simultaneously when the offboard devices are hosting the same or similar datalink applications 175. For example, an uplink message received from ground system 160 is decoded and modified to transmit selective data to an EFB and a mobile device (such as a tablet, smartphone, iPad, etc.) simultaneously. In exemplary embodiments, when a downlink message is generated by either the first device, such as device 180 or an offboard device, such as second device 170, the downlink message is analyzed to determine which other device is running a corresponding application to the application that generated the downlink message and the message is simultaneously forwarded to the other of the first device 180 and second device 170. Accordingly, multiple users can access the data information at the same time using their offboard devices increasing user efficiency.

In exemplary embodiments, first device 180 and second device 170 may become unsynchronized when second device 170 is unavailable. For example, second device 170 may be powered down or second device 170 may be moved to a different vehicle 150. Consequently, first device 180 and second device 170 may lose synchronization as datalink messages are received and processed by application 125 when second device 170 is not available. In such exemplary embodiments, the first device 180 and second device 170 are synchronized by repeating the synchronization process of system 100 as described herein.

Figure 2:
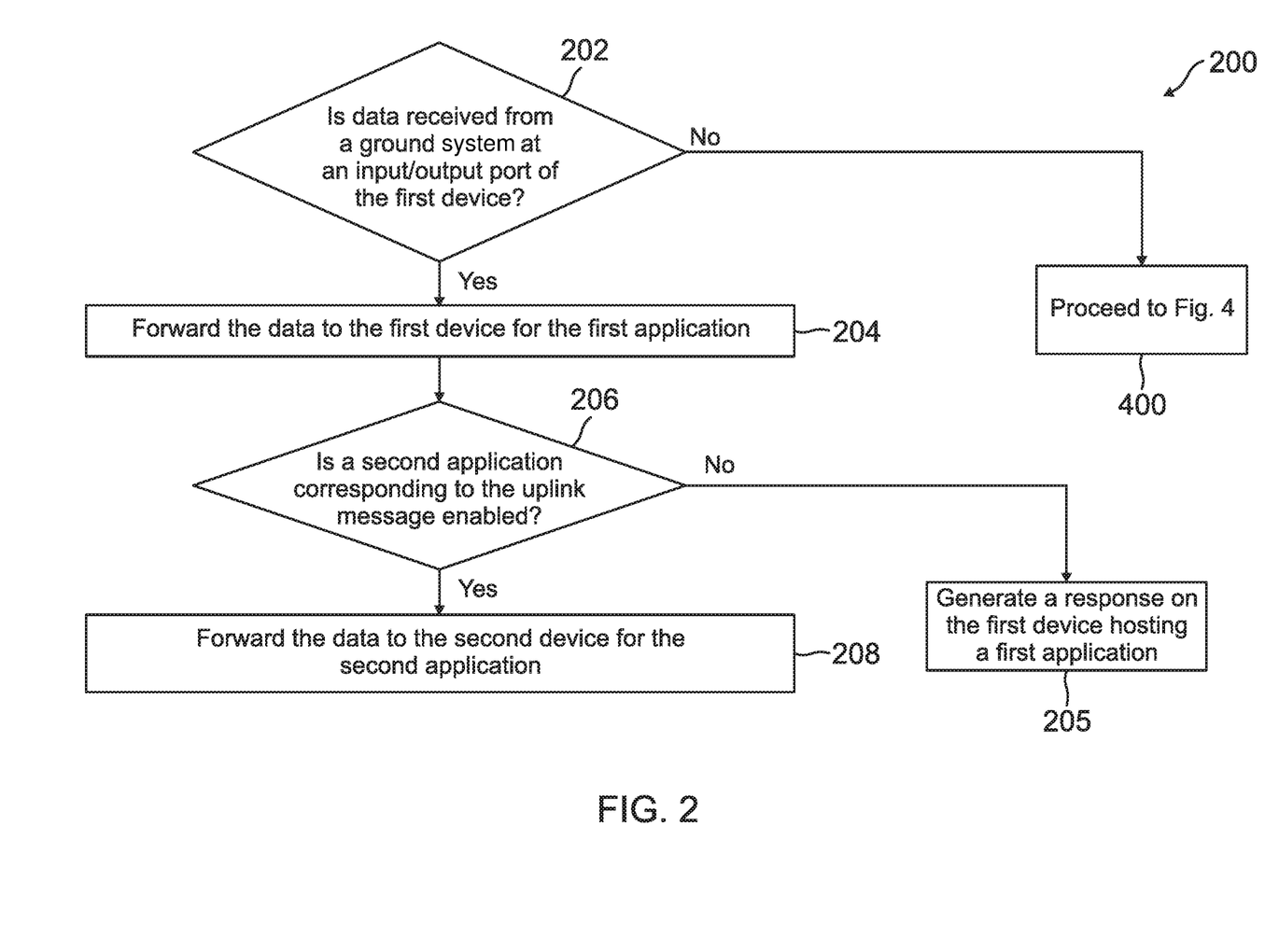
FIGS. 2-3 illustrate flow diagrams of exemplary embodiments of a method for synchronization of data between two devices, when the data is an uplink message.
Figure 3:
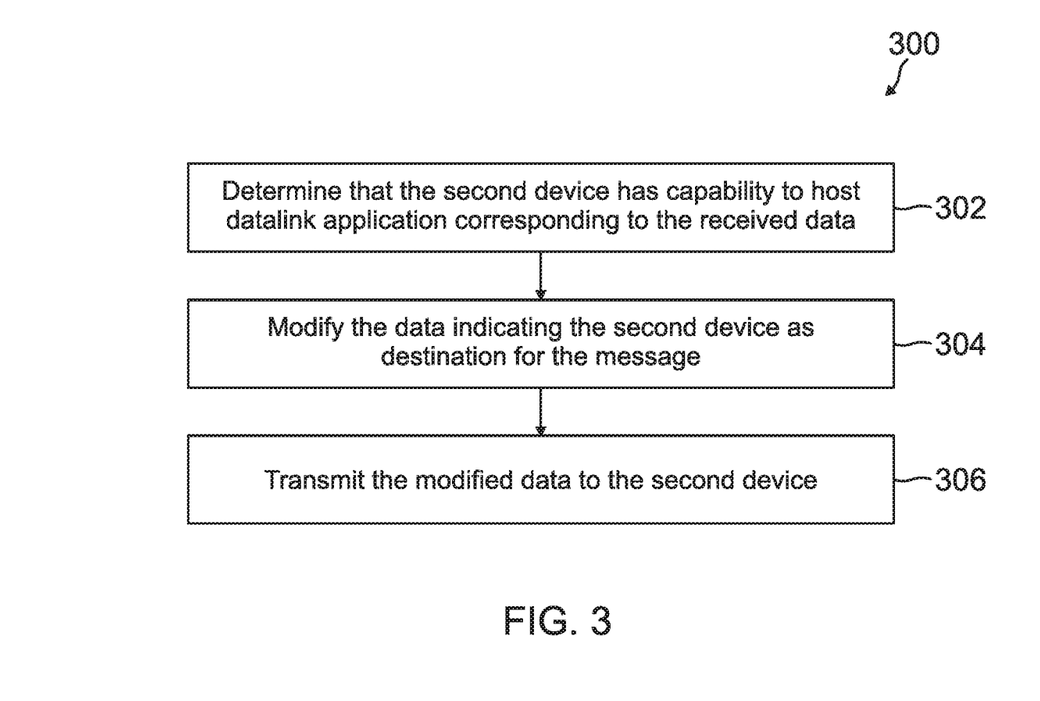
Figure 4:
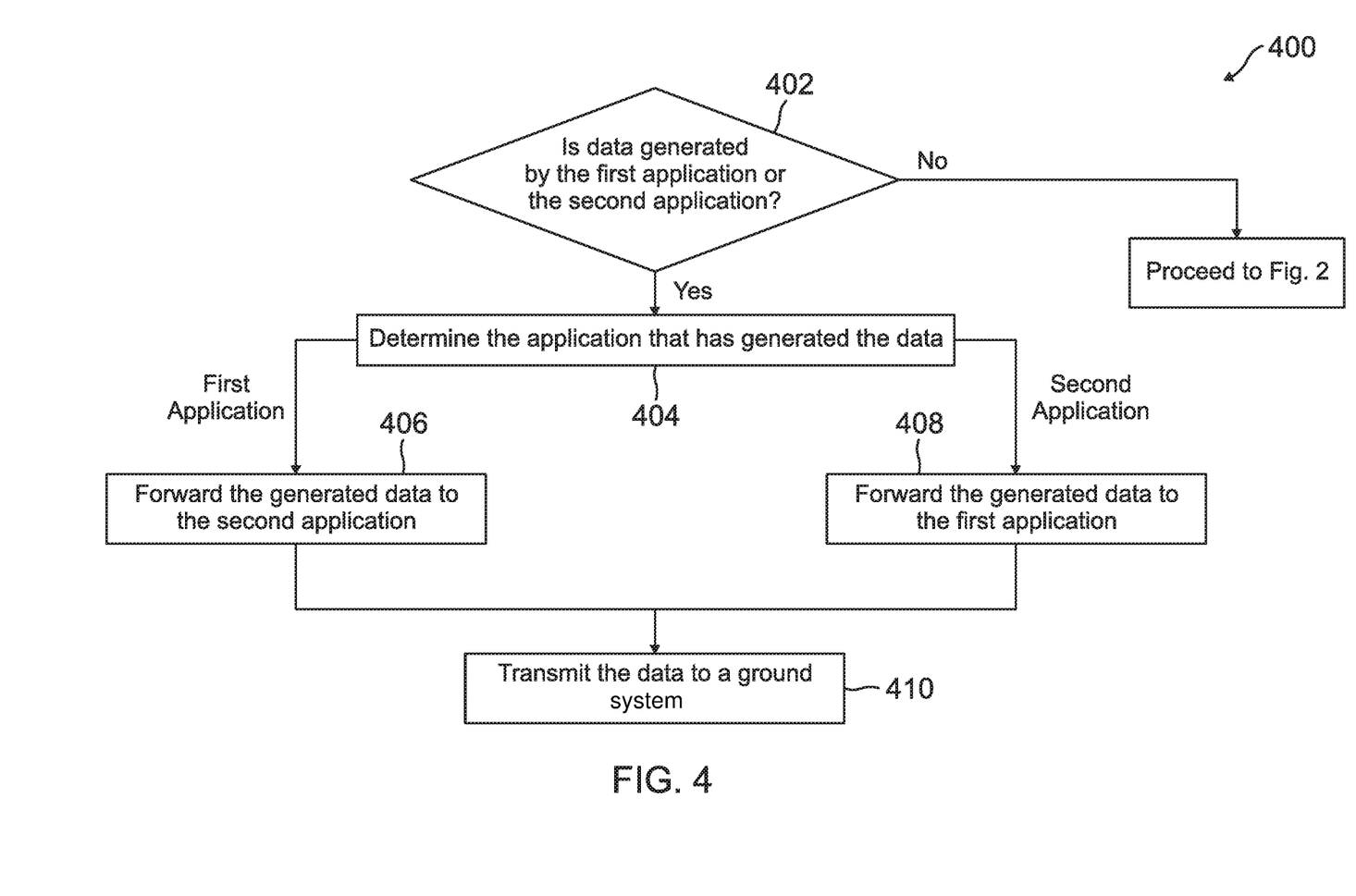
FIG. 4 illustrates a flow diagram of one exemplary embodiment of a method for synchronization of data between two devices, when the data is a downlink message.

FIGS. 2-4 are flow diagrams of various example methods 200, 300 and 400 for synchronizing data between two devices, such as first and second devices 180 and 170, when the data in an uplink message. It should be understood that methods 200-400 may be implemented in conjunction with any of the various embodiments and implementations described in this disclosure above or below. As such, elements of methods 200-400 may be used in conjunction with, in combination with, or substituted for elements of those embodiments. Further, the functions, structures and other description of elements for such embodiments described herein may apply to like named elements of methods 200-400 and vice versa. Further, the example flow diagram is provided as an ordered sequence of steps. Other sequences are possible. Hence, embodiments are not limited to the order of sequence provided in FIGS. 2-4.

FIG. 2 is a flow diagram of one exemplary embodiment of a method 200 for synchronization of data between two devices, when the data is an uplink message. Method 200 begins at block 202 with determining whether data is received by a communication management unit, such as CMU 110 at an input/output port, such as port 140, from a ground station, such as ground system 160. When the data is received from a ground station, method 200 proceeds to block 204. When the data is not received from a ground station, method 200 proceeds to method 400 illustrated in FIG. 4.

When the data is received from a ground system, method 200 then proceeds to block 204 with forwarding the data to a first device hosting a first application. Method 200 then proceeds to block 206 with determining if the second application corresponding to the uplink message is enabled. When the second application corresponding to the uplink message is enabled, method 200 proceeds to block 208 with forwarding the data to the second device for the second application. When the second application corresponding to the uplink message is not enabled, method 200 proceeds to block 205 with generating a response on a first application hosted by the first device.

In exemplary embodiments, the data received from the ground system is at least one of an airline operational controller (AOC) message, an air traffic controller (ATC) message, automatic dependent surveillance (ADS) message and an air traffic services (ATS) message. In further exemplary embodiments, the data received from the ground station is at least one of a FMS AOC and a CMU/CMF AOC. In exemplary embodiments, the data received from the ground system is at least one of a maintenance message, a cabin terminal message, and an EFB message.

In exemplary embodiments, forwarding the data to the second device for the second application comprises method 300 illustrated in FIG. 3. As shown in FIG. 3, method 300 begins at block 302 with determining that the second device has capability to host datalink application corresponding to the received data. Method 300 then proceeds to block 304 with modifying the data indicating the second device as destination for the message. Finally, method 300 proceeds to block 306 with transmitting the modified data to the second device.

FIG. 4 is a flow diagram of one exemplary embodiment of a method 400 for synchronization of data between two devices, when the data is a downlink message. Method 400 begins at block 402 with determining whether the data (message) is generated by one of the first application running on the first device or the second application running on the second device. That is, at block 402, method 400 determines whether the data generated is a downlink message. When the data generated is a downlink message, method 400 proceeds to block 404 with determining whether the first application or the second application generated the data (message).

When the data is generated by the first application, method 400 proceeds to block 406 with forwarding the generated data to the second application. When the data is generated by the second application, method 400 proceeds to block 408 with forwarding the generated data to the first application. In both cases, the message is also transmitted to the intended destination, namely the ground system (410). That is, after the message is forwarded to the other of the first and the second application, the response message may be modified to transmit to the intended destination such as a ground station. In exemplary embodiments, forwarding the data to the other of the first and second devices further comprises updating a display status that a response message has been generated in response to the uplink message. In exemplary embodiments, the data is generated in response to or rejection of the received data from the ground station.

In exemplary embodiments, the first device is an onboard device of a vehicle, and the second device is an offboard device. In further exemplary embodiments, the offboard device is at least one of: and electronic flight bag (EFB), a smartphone, and a tablet. In an example, the vehicle is an aircraft.

In accordance with common practice, the various described features are not drawn to scale but are drawn to emphasize specific features relevant to the exemplary embodiments.

Exemplary Embodiments

Example 1 includes a communication system, comprising: a communication management unit (CMU) comprising a processor, a memory and an input/output port; wherein the processor is configured to run a distribution application operable to: when data is received from a ground system at the input/output port, transmit the data to a designated first device and transmit selected data of the data received at the input/output port to at least one designated second device; and when data is received from the first device or the second device, transmit the data to the other of the first and second device as well as an intended recipient of the data.

Example 2 includes the communication system of Example 1, wherein the at least one designated second device is an offboard device.

Example 3 includes the communication system of Example 2, wherein the offboard device is at least one of: an electronic flight bag (EFB), a smartphone, and a tablet.

Example 4 includes the communication system of any of Examples 1-3, wherein the first device is an onboard device of a vehicle.

Example 5 includes the communication system of Example 4, wherein the vehicle is an aircraft.

Example 6 includes the communication system of any of Examples 1-5, wherein the data received from ground system is at least one of an airline operational controller (AOC) message, an air traffic controller (ATC) message and automatic dependent surveillance (ADS) message, and an air traffic services (ATS) message.

Example 7 includes the communication system of any of Examples 1-6, wherein at least one designated second device comprises a plurality of offboard devices.

Examples 8 includes the communication system of any of Examples 1-7, wherein the second device is an offboard device hosting an offboard datalink application.

Example 9 includes the communication system of any Examples 1-8, wherein transmit the data to a first device and transmit selected data of the data received at the input/output port to at least one designated second device further comprises: determine that the second device has capability to host datalink application corresponding to the received data; modify the data indicating the second device as destination for the message; and transmit the modified data to the second device.

Example 10 includes a method to synchronize data between first application running on a first device and a second application running on a second device: when data is received at an input/output port of a communication management unit for the first device from a ground system: forwarding the data to the first device for the first application, and forwarding at least a portion of the data to at least one designated second device for the second application; and when data is generated by one of the first application running on the first device and the second application running on the at least one designated second device: forwarding at least a portion of the data to the other of the first and second devices, and forwarding the data to the ground system.

Example 11 includes the method of Example 10, wherein forwarding at least a portion of the data to the at least one designated second device for the second application comprises forwarding the at least a portion of the data to an offboard device.

Example 12 includes the method of Example 11, wherein forwarding the at least a portion of the data to an offboard device further comprises forwarding the at least a portion of the data to at least one of: an electronic flight bag (EFB), a smartphone, and a tablet.

Example 13 includes the method of any of Examples 10-12, wherein forwarding the data to the other of the first and second devices further comprises determining that the data is generated in response to the received data at input/output port of the first device from the ground system.

Example 14 includes the method of Example 13, wherein forwarding the data to the other of the first and second devices further comprises updating display status that a response message has been generated in response to the uplink message.

Example 15 includes the method of Examples 1-14, wherein: forwarding at least a portion of the data to at least one designated second device for the second application further comprises forwarding at least a portion of the data to at least a second device for the second application from an onboard device of a vehicle; and forwarding the data to the other of the first and the second devices further comprises forwarding the data to an onboard device of a vehicle.

Example 16 includes the method of Examples 1-15, wherein forwarding at least a portion of the data to the at least one designated second device for the second application further comprises: determining that the at least one designated second device has capability to host datalink application corresponding to the received data; modifying the data indicating the at least one designated second device as destination for the message; and transmitting the modified data to the at least one designated second device.

Example 17 includes a non-transitory computer readable medium storing a program having instructions stored thereon, executable by a processor, to perform a method synchronize data between first application running on a first device and a second application running on a second device, the method comprising: when data is received at an input/output port of a communication management unit for the first device from a ground system, forwarding the data to the first device for the first application, and forwarding at least a portion of the data to at least one designated second device for the second application; and when data is generated by one of the first application running on the first device and the second application running on the at least one designated second device, forwarding at least a portion of the data to the other of the first and second devices, and forwarding the data to the ground system.

Example 18 includes the non-transitory computer readable medium of Example 17, wherein forwarding at least a portion of the data to the second device for the second application further comprises: determining that the second device has capability to host datalink application corresponding to the received data; modifying the data indicating the second device as destination for the message; and transmitting the modified data to the second device.

Example 19 includes the non-transitory computer readable medium of any of Examples 17-18, wherein the first device is an onboard device of a vehicle.

Example 20 includes the non-transitory computer readable medium of any of Examples 17-19, wherein the second device is an offboard device.

In various alternative embodiments, system elements, method steps, or examples described throughout this disclosure (such as the processor 120 and/or sub-parts thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited, to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A communication system, comprising:
  a communication management unit (CMU) located on a vehicle, wherein the CMU is configured to send downlink messages and receive uplink messages, and wherein the CMU comprises a processor, a memory and an input/output port;
  wherein the processor is configured to run a distribution application operable to:
    when data is received in an uplink message from a ground system at the input/output port, transmit the data to a designated first device and transmit selected data of the data received at the input/output port to at least one designated second device; and
    when data is received in a downlink message from the first device or the second device, transmit the data to the other of the first and second device as well as an intended recipient of the data at the ground system.

2. The communication system of claim 1, wherein the at least one designated second device is an offboard device.

3. The communication system of claim 2, wherein the offboard device is at least one of: an electronic flight bag (EFB), a smartphone, and a tablet.

4. The communication system of claim 1, wherein the first device is an onboard device of the vehicle.

5. The communication system of claim 1, wherein the vehicle is an aircraft.

6. The communication system of claim 1, wherein the data received from ground system is at least one of an airline operational controller (AOC) message, an air traffic controller (ATC) message and automatic dependent surveillance (ADS) message, and an air traffic services (ATS) message.

7. The communication system of claim 1, wherein at least one designated second device comprises a plurality of offboard devices.

8. The communication system of claim 1, wherein the second device is an offboard device hosting an offboard datalink application.

9. The communication system of claim 1, wherein transmit the data to a first device and transmit selected data of the data received at the input/output port to at least one designated second device further comprises:
  determine that the second device has capability to host datalink application corresponding to the received data;
  modify the data indicating the second device as destination for the message; and
  transmit the modified data to the second device.

10. A method to synchronize data between a first application running on a first device and a second application running on a second device:
- receiving an uplink message including uplink data at an input/output port of a communication management unit (CMU) located on a vehicle for the first device from a ground system;
- forwarding the uplink data to the first device for the first application,
- forwarding at least a portion of the uplink data to at least one designated second device for the second application; and
- receiving a downlink message including downlink data that is generated by one of the first application running on the first device and the second application running on the at least one designated second device;
- forwarding at least a portion of the downlink data to the other of the first and second devices, and
- forwarding the downlink data to the ground system.

11. The method of claim 10, wherein forwarding at least a portion of the data to the at least one designated second device for the second application comprises forwarding the at least a portion of the data to an offboard device.

12. The method of claim 11, wherein forwarding the at least a portion of the data to an offboard device further comprises forwarding the at least a portion of the data to at least one of: an electronic flight bag (EFB), a smartphone, and a tablet.

13. The method of claim 10, wherein forwarding the at least a portion of the data to the other of the first and second devices further comprises determining that the data is generated in response to the received data at input/output port of the first device from the ground system.

14. The method of claim 13, wherein forwarding the data to the other of the first and second devices further comprises updating display status that a response message has been generated in response to the uplink message.

15. The method of claim 10, wherein:
- forwarding at least a portion of the data to at least one designated second device for the second application further comprises forwarding at least a portion of the data to at least a second device for the second application from an onboard device of the vehicle; and
- forwarding at least a portion of the data to the other of the first and the second devices further comprises forwarding the data to an onboard device of the vehicle.

16. The method of claim 10, wherein forwarding at least a portion of the data to the at least one designated second device for the second application further comprises:
- determining that the at least one designated second device has capability to host datalink application corresponding to the received data;
- modifying the data indicating the at least one designated second device as destination for the message; and
- transmitting the modified data to the at least one designated second device.

17. A non-transitory computer readable medium located on a communications management unit (CMU) of a vehicle that is configured to send downlink messages and receive uplink messages, the non-transitory computer readable medium storing a program having instructions stored thereon, executable by a processor, to perform a method to synchronize data between a first application running on a first device and a second application running on a second device, the method comprising:
- when data is received in an uplink message at an input/output port of the CMU for the first device from a ground system,
- forwarding the data to the first device for the first application,
- forwarding at least a portion of the data to at least one designated second device for the second application;
- when data is generated for a downlink message by one of the first application running on the first device and the second application running on the at least one designated second device,
- forwarding at least a portion of the data to the other of the first and second devices, and
- forwarding the data to the ground system.

18. The non-transitory computer readable medium of claim 17, wherein forwarding at least a portion of the data to the second device for the second application further comprises:
- determining that the second device has capability to host datalink application corresponding to the received data;
- modifying the data indicating the second device as destination for the message; and
- transmitting the modified data to the second device.

19. The non-transitory computer readable medium of claim 17, wherein the first device is an onboard device of the vehicle.

20. The non-transitory computer readable medium of claim 17, wherein the second device is an offboard device.

* * * * *